C. H. Pickering.
Potato Digger.
No. 66,252.  Patented Jul. 2, 1867.
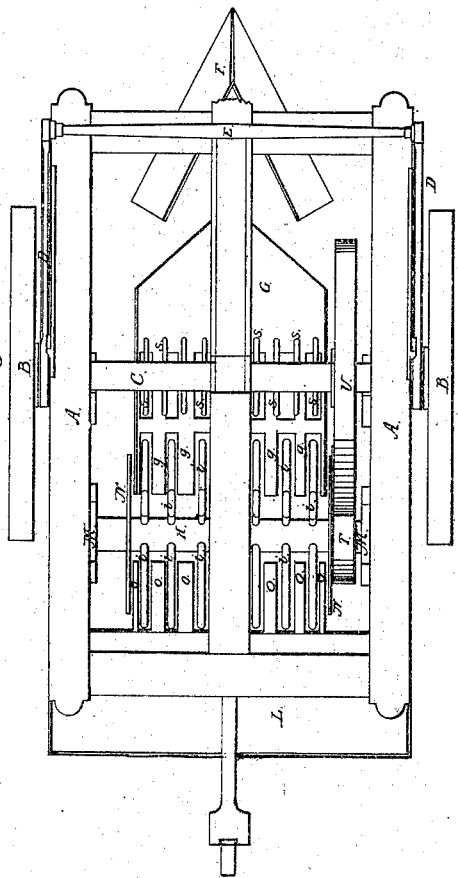
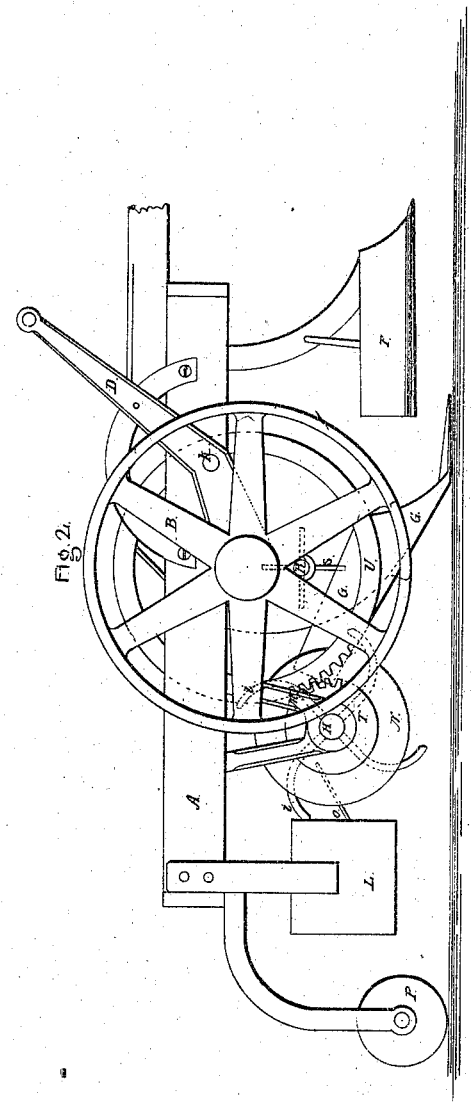
Witnesses:
Inventor:
Charles H. Pickering

United States Patent Office.

CHARLES H. PICKERING, OF INDIANAPOLIS, INDIANA.

Letters Patent No. 66,252, dated July 2, 1867; antedated June 27, 1867.

IMPROVEMENT IN POTATO-DIGGER.

*The Schedule referred to in these Letters Patent and making part of the same.*

TO ALL WHOM IT MAY CONCERN:

Be it known that I, CHARLES H. PICKERING, of the city of Indianapolis, county of Marion, and State of Indiana, have invented a new and useful Machine for Digging Potatoes; and I do hereby declare that the following is a full and exact description thereof, reference being had to the accompanying drawings, and to the letters of reference marked thereon.

My invention relates to a machine for digging and gathering potatoes, so arranged as to scrape and clean the vines and weeds from the rows in front of the machine, and plough up the potatoes with a double-shared plough, having slats or bars attached to the rear of the share to hold up the potatoes and sift out the soil, and a rotary gatherer with curved arms to take the potatoes from the slats and deposit them in a box hung to the rear of the machine.

A is the frame, to which all the other parts of the machine are attached; B are wheels fixed upon an axle, C, which is hung in the lower ends of levers D. The levers D are attached to the frame at K, which forms their fulcrum. The upper ends of the levers D are connected with a bar, E, so that both may be operated at once by the driver. This arrangement of hanging the wheels B is for the purpose of throwing them forward and downward, in order to support the plough G off the ground in transporting the machine to or from the field, and also at the same time to throw the rotating gatherer H out of gear. To a downward projecting standard a double-shared plough, G, is attached, which has slats or bars, $g$, projecting from the rear and inclining upward to receive the potatoes as they are dug up by the plough G. In front of the plough G is another double-shared plough, F, set so as to merely skim the ground and clear away the vines and weeds and take off a little of the top soil. At the rear end of the bars $g$ is a rotary gatherer, H, consisting of a shaft having curved arms $i$, that work up between the slats $g$ and gather the potatoes and carry them over and deposit them in the box L, or rather on the chute O that conveys them to the box L, which is hung to the rear end of the machine. The rotating gatherer H is hung in the hangers M, as shown, and has flanges or plates N to prevent the potatoes getting out of the end. Side-boards are also fixed to the share and at the side of the slats of the plough G, to prevent the potatoes from rolling off the side. A truck-wheel, P, is attached at the rear end of the machine to support it. A clod-crusher, R, is hung over the plough G, as shown, which is rotated by the earth catching on the points of the pins S as the machine moves forward, which crushes and pulverizes the soil so that it will sift through the spaces between the slats $g$.

The rotary gatherer is operated by the small cog-wheel T on its own shaft, and the large cog-wheel U on the shaft C. Only a few of the cogs on these wheels are shown in the drawing, the outline of the wheels being drawn in full line. By throwing the upper ends of levers D back, the driving-wheels B are brought forward and downward so as to support the plough G out of the ground, and admit of the machine being hauled from place to place without the plough G entering the ground; and this also separates the cog-wheels T and U so that the gatherer is not operated when the machine is entered at the commencement of the row of potatoes. The plough G runs under them until they ride upon the slats $g$, the soil sifts through the spaces, and the rotating gatherer lifts the potatoes and carries them over on to the inclined slats O to the box L, from which they can be emptied at the end of the row.

Having thus fully described my invention, what I claim as new, and desire to secure by Letters Patent, is—

1. The double-shared plough G, with the slats $g$ and side-boards as shown, in combination with the rotating gatherer H, substantially as and for the purpose set forth.

2. The scraper-plough F, in combination with the double-shared plough G, substantially as and for the purpose set forth.

3. The arrangement of the levers D for supporting and operating the wheels B, substantially as and for the purpose set forth.

4. The slatted inclined plane O, for conveying the potatoes to the box L, in combination with the rotating carrier H, substantially as and for the purpose set forth.

CHARLES H. PICKERING.

Witnesses:
G. M. LEVETTE,
O. F. MAYHEW.